United States Patent [19]
Lewis

[11] 3,803,817
[45] Apr. 16, 1974

[54] FILTER ASSEMBLY
[75] Inventor: Robert David Lewis, Coloma, Mich.
[73] Assignee: A-T-O Inc., Willoughby, Ohio
[22] Filed: Nov. 2, 1971
[21] Appl. No.: 194,946

[52] U.S. Cl. ............... 55/498, 55/DIG. 35, 55/505, 55/14, 55/521, 128/142.6, 210/493
[51] Int. Cl. ........................................... B01d 27/06
[58] Field of Search ............ 55/498, 419, 521, 505, 55/DIG. 35; 210/493; 128/140, 141, 142.6

[56] References Cited
UNITED STATES PATENTS
| | | | |
|---|---|---|---|
| 3,133,847 | 5/1964 | Millington | 210/493 |
| 3,202,150 | 8/1965 | Miller | 128/142.6 |
| 3,527,029 | 9/1970 | Kirschner | 55/514 |
| 3,279,616 | 10/1966 | Bourdale | 210/487 |
| 3,293,830 | 12/1966 | McKinlay | 55/498 |

FOREIGN PATENTS OR APPLICATIONS
| | | | |
|---|---|---|---|
| 655,223 | 4/1933 | Germany | 210/493 |

*Primary Examiner*—Bernard Nozick
*Attorney, Agent, or Firm*—Christel & Bean

[57] ABSTRACT

An annular filter element having a plurality of radially extending pleats adhesively secured in a canister having an end face provided with a multiplicity of openings therethrough. A cover having a central outlet is secured to the open end of the canister to form an enclosure for the filter element. Air flows axially through the openings, across the filter and through the cover outlet in registry with the user's breathing path.

3 Claims, 11 Drawing Figures

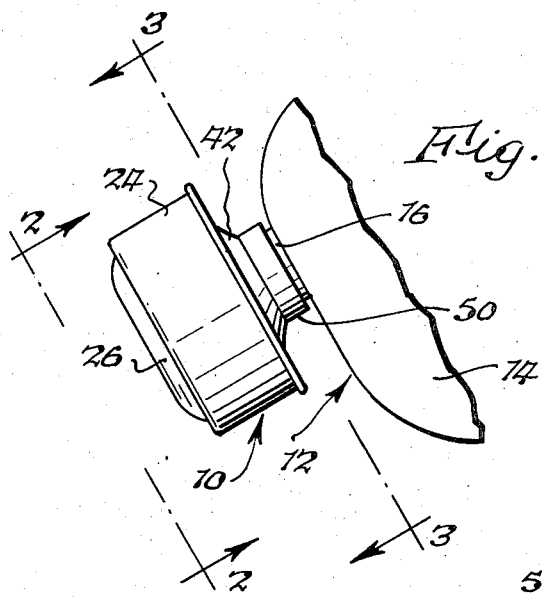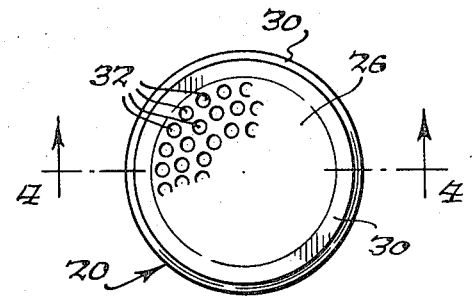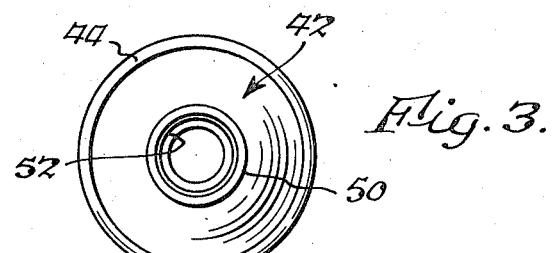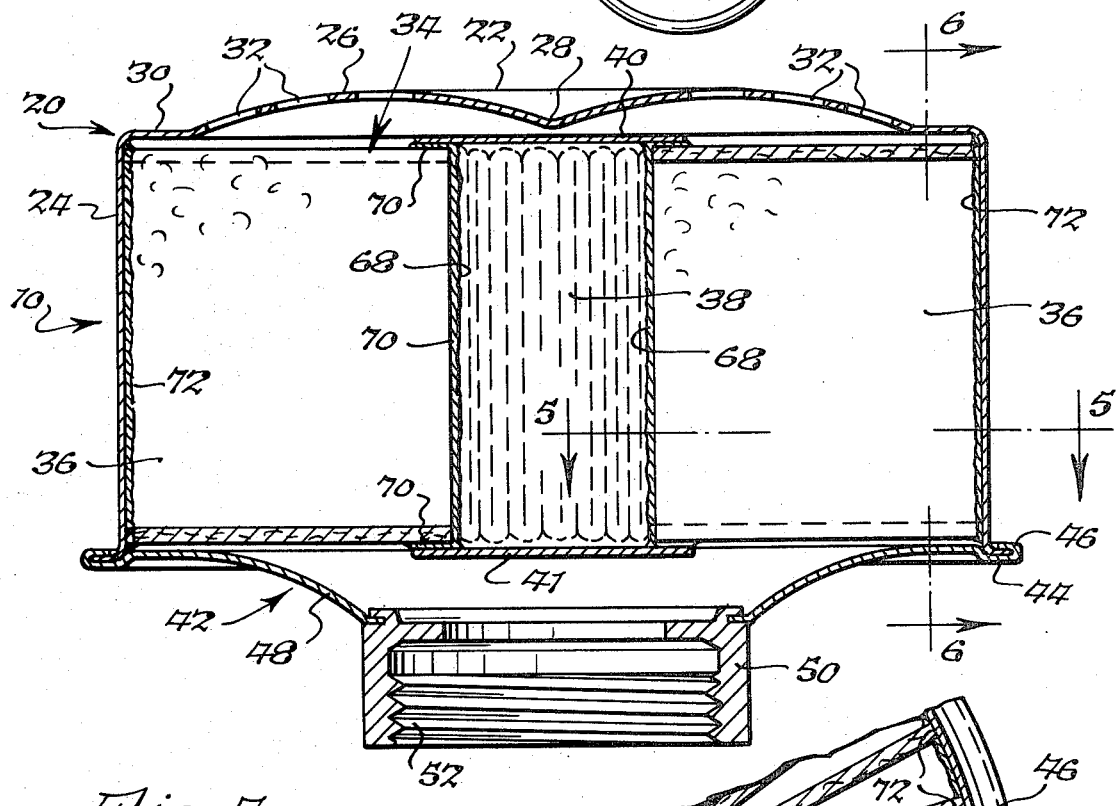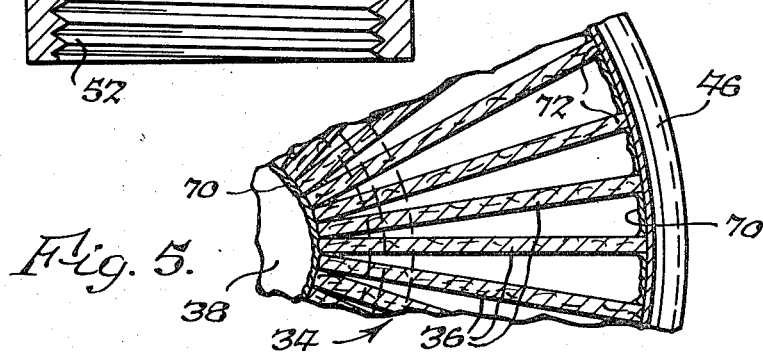

FILTER ASSEMBLY

BACKGROUND OF THE INVENTION

This invention relates generally to a filter assembly and, more particularly, to a radial type filter assembly used for respiration.

Various types of respirators, incorporating filtering media, have been developed for use in contaminated atmospheres for removing dust and other minute particles of foreign matter. Sometimes, these respirators incorporate annular filter units comprised of a folded filtering material, such as felt, in which the fold lines of the pleats extend axially of the annular filter element. Such filter units are generally contained within a cylindrical housing having perforations or openings in the side wall thereof for the entry of the ambient air which takes a path of movement radially into the filter unit and generally normal to the axis thereof and then is caused to change direction approximately 90° to pass axially through the outlet of the filter unit. These known radial type filtering assemblies have certain disadvantages. For example, because the path of movement of air flow takes a 90° turn, a substantial pressure drop occurs across the filter unit, requiring additional effort on the part of the user during aspiration. Also, the surface area of filter media is only partially utilized to filter the particulate matter entrained in the air, with a consequent loss in efficiency.

SUMMARY OF THE INVENTION

Accordingly, it is an object of the present invention to provide an improved filtering assembly including an annular filter element having an optimal filtering surface area within a given volume of space.

It is another object of this invention to provide the foregoing filtering assembly with axial passage means for reducing the pressure drop across the filter to a minimum.

It is another object of the present invention to provide an improved method for forming a filter element and for assembling the latter within a canister.

In one aspect thereof, the filtering assembly of this invention is characterized by the provision of an annular filter element formed of multiple folds of paper having circumferentially spaced pleats, the fold lines of which extend radially from the axis of the filter element. The filter element is enclosed within a canister having a multiplicity of openings in an end face thereof and a central opening in the cover at the other end of the canister for providing axial flow through the filter in registry with the user's breathing path utilizing the optimal surface area of the filter element with a minimum of pressure drop.

The foregoing and other objects, advantages, and characterizing features of the present invention will become clearly apparent from the ensuing detailed description thereof, taken together with the accompanying drawings wherein like reference characters denote like parts throughout the various views.

BRIEF DESCRIPTION OF THE DRAWINGS

FIG. 1 is a side elevational view of a filter assembly, constructed in accordance with this invention, shown attached to a respirator;

FIG. 2 is a front elevational view of the filter assembly of FIG. 1;

FIG. 3 is a rear elevational view of the filter assembly of FIG. 1;

FIG. 4 is a longitudinal sectional view, on an enlarged scale, of the filter assembly of this invention;

FIG. 5 is a fragmentary transverse sectional view thereof, taken about on line 5—5 of FIG. 4;

DETAILED DESCRIPTION OF AN ILLUSTRATIVE EMBODIMENT

Figure 6:
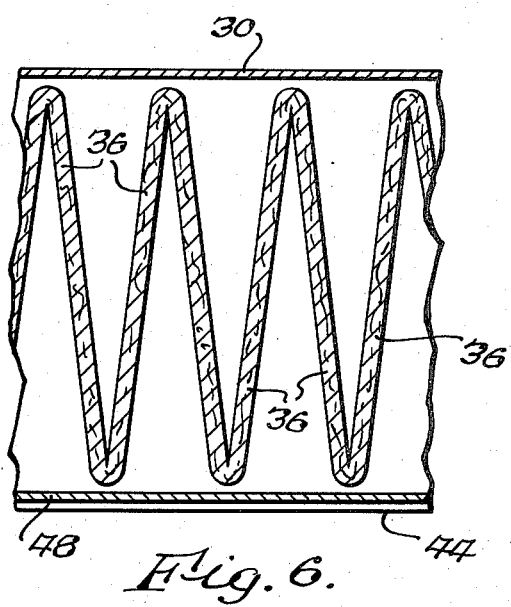
FIG. 6 is a fragmentary sectional view thereof taken about on line 6—6 of FIG. 4.

Referring now in detail to the illustrative embodiment depicted in the drawings, there is shown in FIG. 1 a filter assembly, constructed in accordance with this invention and generally designated 10, attached to a respirator, generally designated 12. Respirator 12 includes the usual face mask 14, preferably formed of rubber, or any other suitable material shaped to conform to the contour of the user's face to at least enclose the nose and mouth of a user. Mask 14 is provided with a substantially rigid, externally threaded fitting 16 adapted to releasably secure the filter assembly of this invention in a manner locating the latter in registry with the user's breathing path.

As best shown in FIG. 4, filter assembly 10 comprises a cylindrical, replaceable, metallic canister 20 having an end face 22 and a cylindrical wall 24. End face 22 is provided with a slightly outwardly bulged portion 26 having a central dimple or recess 28 therein and an annular rim portion 30 extending around the periphery of portion 26 and formed integral with cylindrical wall 24. A multiplicity of openings 32 are provided in the annular bulged portion 26 of the end face 22 for a purpose to be explained.

Figure 11:
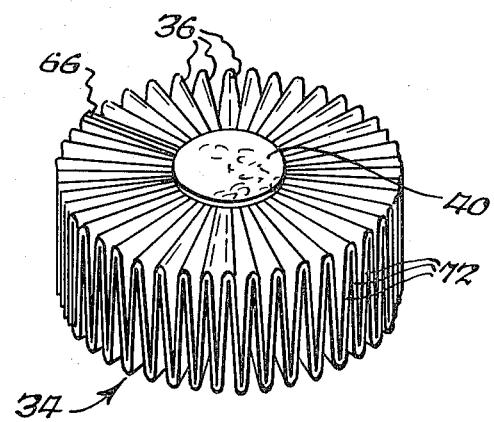
FIG. 11 is a perspective view of a filter element constructed in accordance with this invention.

Adhesively secured within canister 20 is an annular filter element (FIG. 11), generally designated 34, comprising a suitable sheet-like porous filter material, such as paper for example, arranged in radial pleats or folds 36 extending radially from a central passage or opening 38. Circular discs or buttons 40 and 41, preferably formed of cardboard, are adhesively secured to opposite faces of filter element 34 and cover the opposite ends of passage 38.

The open end of canister 20 is closed by a generally circular cover 42 (FIG. 3) having a beaded flange 44 about the periphery thereof rolled into sealing relation with an outwardly extending flange 46 formed integral with canister 20 at the open end thereof. Cover 42 has an outwardly curved face 48 provided with a central, tubular fitting 50 having a passage therein serving as the outlet of canister 20 and provided with internal threads 52 for attachment to the mask fitting 16. Thus, filter assembly 10 can be readily attached to and removed from a respirator for easy replacement.

Figure 7:
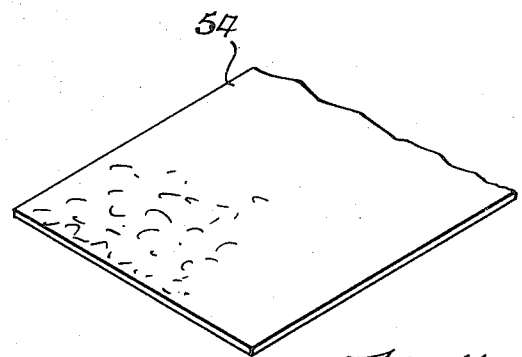
FIG. 7 is a fragmentary, perspective view of a sheet of filtering material of which the filter element of this invention is formed.
Figure 8:
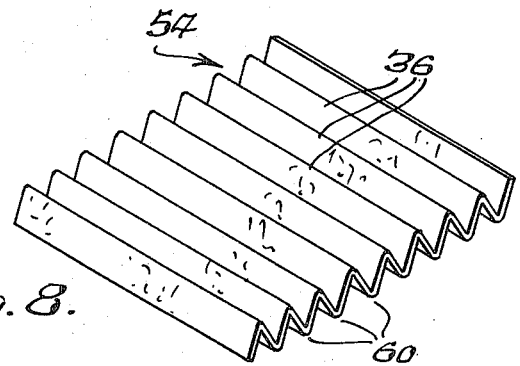
FIGS. 8, 9 and 10 are perspective views illustrating various stages of the formation of the filter element of this invention.
Figure 9:
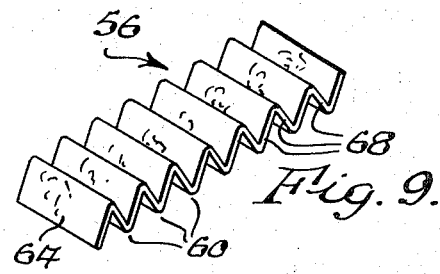
Figure 10:
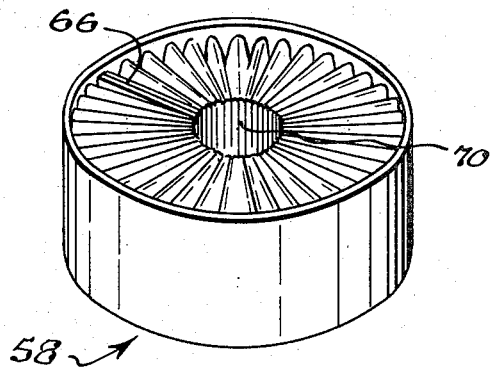

Filter element 34 is formed and assembled with canister 20 in accordance with the following method:

A continuous, flat sheet of material 54 (FIG. 7), consisting of thin filtering material such as porous tissue paper for example, is folded along transversely extending fold lines to produce folds or pleats of the desired height which are generally equally spaced longitudinally of sheet 54 as shown in FIG. 8. This folded sheet is then cut into discrete strips 56 (FIG. 9) each having the desired width and length to ulitmately form the finished annular filter element. The exemplary strip 56 shown in FIG. 9 is illustrative only and can be lengthened as desired, to form an annular filter element of any desired size. Strip 56 is inserted in a compressed condition i.e. with the folds 36 tightly squeezed together into a cylindrical jig 58 (FIG. 10) having the same diameter as the canister in which the finished filter is to be enclosed. Strip 56 is placed in jig 58 with the longitudinal edges 60 of the folds thereof on one side of the strip positioned against the bottom of jig 58. Strip 56 is then bent through 360° to bring the opposite end portions 64 together and the folds are fanned or spread apart to extend radially in a spoke-like arrangement. End portions 64 are bonded together by a suitable adhesive to form a seam 66 and prevent the escape of air therethrough. The inner edges 68 of the now annular filter are bonded together by a suitable adhesive 70 (FIGS. 4 and 10) and define the central passage or opening 38 from which pleats 36 extend. Disc 40 is then secured to the exposed face of the filter element over one end of passage 38 by adhesive 70. After the adhesive has set, the substantially finished filter element 34 can be removed as a self-contained unit from jig 58 in readiness for assembly with canister 20.

The outer peripheral edges 72 of pleats 36 are coated with adhesive 70 by any suitable means, such as a rotating wheel having a peripheral surface that passes through a pan or supply of such adhesive. Meanwhile, the inner surface of cylindrical wall 24 also is coated or sprayed with adhesive 70. After the adhesive applying operation, filter element 34 is placed into canister 20 with button 40 disposed adjacent end face 22 of canister 20 and the adhesive is allowed to set. After the adhesive has dried, filter element 34 is bench checked for leaks and can be repaired if necessary. Finally, button 41 is adhesively secured to the other face of filter element 34 closing the other end of passage 38 and cover 42 can be seam rolled or otherwise secured to the open end of canister 20 to form the completed filter assembly 10 of this invention.

A particular feature of this invention is the provision of openings 32 in the outer end face 22 to provide axial flow of breathing air from the ambient atmosphere, through filter element 34 and outwardly through the passage in fitting 50 in registry with the user's breathing path. This arrangement utilizies the optimal surface area of the filter element since the air flow is directed completely thereacross. Moreover, the air flow is substantially linear and in registry with the user's breathing path so that the pressure drop across the filter is kept to a minimum. This enables the user to breathe normally without unduly increasing his effort during aspiration, as opposed to conventional radial-type filter assemblies in which the ambient air is inhaled through the side wall of the canister requiring the path of air flow to make a 90° turn.

From the foregoing, it is seen that the present invention fully accomplishes its intended objects and provides a simple, relatively inexpensive annular filter element having radially extending pleats, which filter element can be easily fabricated and enclosed in a canister in accord with the method of this invention. The canister end face is provided with a multiplicity of openings to provide axial flow of the ambient air through such openings, across the filter element and through the cover outlet in registry with the user's breathing path without any substantial added effort on his part during aspiration. By arranging the filter material with the pleat forming fold lines extending radially, there is provided a greater surface area of filter media for a given canister diameter, and since the air flow is axially across the entire filter element, the optimal filtering surface area is available, at lower pressure drop, for removing dust and other minute foreign particles.

A preferred embodiment of this invention having been disclosed in detail, it is to be understood that this has been done by way of illustration only.

I claim:

1. A filter assembly comprising: an annular filter element having a plurality of circumferentially spaced pleats the fold lines of which extend radially relative to the axis of said filter element; a canister having an end face provided with a multiplicity of openings therethrough, a side wall, and an open end axially spaced from said end face; means adhesively bonding the outer edges of said pleats to said canister side wall for securing said filter element in said canister; means sealing said inner edges of said pleats together and defining a central opening; means closing the opposite ends of said central opening; and cover means closing said open end of said canister for enclosing said filter element; said cover means having a central outlet whereby ambient air flows axially through said end face openings, said filter element and said central outlet in registry with the user's breathing path.

2. A filter assembly according to claim 1 wherein said inner edges of said pleats are adhesively secured together.

3. A filter assembly according to claim 1 wherein said closing means comprises discs adhesively secured to the opposite faces of said annular filter element.

* * * * *